United States Patent
Abe et al.

(10) Patent No.: US 12,267,410 B2
(45) Date of Patent: Apr. 1, 2025

(54) MANAGING ACCESS TO TAPE CARTRIDGES AT A TAPE ARCHIVAL SERVICE PROVIDER

(71) Applicant: INTERNATIONAL BUSINESS MACHINES CORPORATION, Armonk, NY (US)

(72) Inventors: Atsushi Abe, Ebina (JP); Tsuyoshi Miyamura, Yokohama (JP); Kohei Taguchi, Yokohama (JP); Kenji Mikuni, Inzai (JP); Tsuyoshi Kamenoue, Adachi-ku (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 194 days.

(21) Appl. No.: 18/064,217

(22) Filed: Dec. 9, 2022

(65) Prior Publication Data
US 2024/0195606 A1 Jun. 13, 2024

(51) Int. Cl.
*H04L 9/08* (2006.01)
(52) U.S. Cl.
CPC .......... *H04L 9/0822* (2013.01); *H04L 9/0825* (2013.01)
(58) Field of Classification Search
CPC ....... H04L 9/08; H04L 9/0816; H04L 9/0822; H04L 9/0825
See application file for complete search history.

(56) References Cited

U.S. PATENT DOCUMENTS

| 7,630,493 | B2* | 12/2009 | Sandhu | H04L 9/0847 380/45 |
| 8,145,861 | B1 | 3/2012 | Manthey | |
| 8,176,563 | B2* | 5/2012 | Redlich | G06F 21/6209 715/255 |
| 10,491,587 | B2* | 11/2019 | Hon | G06F 16/951 |

(Continued)

FOREIGN PATENT DOCUMENTS

| CN | 100430923 C | 10/2003 |
| CN | 101141463 A | 3/2008 |

(Continued)

OTHER PUBLICATIONS

Taiwanese Office Action dated Jul. 5, 2024, 13 pp. with translation, for Application No. TW112119606 (57.0537).

(Continued)

*Primary Examiner* — Hosuk Song
(74) *Attorney, Agent, or Firm* — KONRAD, RAYNES, DAVDA & VICTOR LLP; David W. Victor

(57) ABSTRACT

Provided are a computer program product, system, and method for managing access to tape cartridges at a tape archival service provider. A determination is made as to whether a non-volatile memory of the tape cartridge stores a key encryption key comprising an encrypted user encryption key associated with a user. In response to determining that the non-volatile memory of the tape cartridge stores the key encryption key, the key encryption key is decrypted to produce the user encryption key. The user encryption key, resulting from the decrypting, is provided to an encryption engine of the tape drive to encrypt plain-text data read from the tape medium in the tape cartridge with the user encryption key to return to a read request.

25 Claims, 8 Drawing Sheets

(56) References Cited

U.S. PATENT DOCUMENTS

| | | | |
|---|---|---|---|
| 10,728,232 B2* | 7/2020 | Yoo | H04L 63/0853 |
| 10,972,290 B2* | 4/2021 | Melo | H04L 9/3247 |
| 11,757,641 B2* | 9/2023 | Ferenczi | H04L 9/3213 |
| | | | 713/159 |
| 11,968,302 B1* | 4/2024 | Kumar | H04L 9/0891 |
| 12,015,721 B1* | 6/2024 | Kumar | H04L 9/3263 |
| 2007/0113078 A1 | 5/2007 | Witt | |
| 2008/0219449 A1 | 9/2008 | Ball | |
| 2008/0273697 A1 | 11/2008 | Greco | |
| 2020/0152235 A1 | 5/2020 | Frank | |
| 2021/0021612 A1 | 1/2021 | Higbee | |
| 2021/0173953 A1 | 6/2021 | Mastenbrook | |
| 2021/0273786 A1 | 9/2021 | Mendonsa | |

FOREIGN PATENT DOCUMENTS

| | | |
|---|---|---|
| TW | 200732939 A | 9/2007 |
| WO | 2007094919 A1 | 8/2007 |
| WO | 2020018644 A1 | 1/2020 |

OTHER PUBLICATIONS

"Tape Library encrypts data autonomously—LTO Ultrium tape systems provide a hardware encryption function", Fujitsu Australia, 2 pp., [online][retrieved Sep. 9, 2022] https://www.fujitsu.com/au/products/computing/storage/tape/eternus-It/feature/strsys-b14.htm.
"IBM TS4300 Tape Library", IBM Corporation, Jun. 24, 2022, 414 pp.
PCT International Search Report and Written Opinion dated Jan. 24, 2024, 8 pp., for Application No. PCT/CN2023/132894 filed Nov. 21, 2023.

\* cited by examiner

MANAGING ACCESS TO TAPE CARTRIDGES AT A TAPE ARCHIVAL SERVICE PROVIDER

BACKGROUND OF THE INVENTION

1. Field of the Invention

The present invention relates to a computer program product, system, and method for managing access to tape cartridges at a tape archival service provider.

2. Description of the Related Art

Certain companies provide tape archival services to allow users to offload archival storage of backup tape cartridges to the tape archival service provider. Tape archival services provide a secure and climate-controlled environment to store archived tape cartridges to minimize physical degradation over time. Typically, the tape archival service will deliver tape cartridges from a storage facilities to the user when the user needs to retrieve data from the tape cartridges.

One drawback with a tape archival service is that it is cumbersome for users to access the tape cartridges sent to the archive when needed because the user typically has to wait for the tape cartridges to be physically returned to the user. Also, there are concerns if data is stored in plain-text in the tape cartridges, then someone at the service provider facility may access tape cartridges to misappropriate sensitive data. If the service provider is not provided access to an encryption key to access encrypted data stored in the tape driver, then the service provider may not be able to transfer user data from older tape cartridges to the newest tape cartridge generation, which can typically store substantial amounts more data than the previous generation cartridges.

There is a need in the art for improved techniques for providing tape archival services to users having collections of tape cartridges.

SUMMARY

A first embodiment provides a computer program product, system, and method for managing access to tape cartridges at a tape archival service provider. A determination is made as to whether a non-volatile memory of the tape cartridge stores a key encryption key comprising an encrypted user encryption key associated with a user. In response to determining that the non-volatile memory of the tape cartridge stores the key encryption key, the key encryption key is decrypted to produce the user encryption key. The user encryption key, resulting from the decrypting, is provided to an encryption engine of the tape drive to encrypt plain-text data read from the tape medium in the tape cartridge with the user encryption key to return to a read request.

The first embodiment provides security and encryption protocols to prevent unauthorized users from reading plain-text data on the tape cartridge by having the tape drive at the tape archival service access the user encryption key in a key encryption key maintained in the tape cartridge. This allows the tape drive to securely access the user encryption key through a series of encryption to then use to encrypt data read from the tape cartridge to provide to a read request and decrypt encrypted write data provided to the tape drive to write to the tape cartridge. In this way, the tape drive ensures that plain-text data on the tape cartridge remains secure and protected by encrypting any external transfers of the data with an encryption key provided by a user that stored the data in the tape cartridge.

The first embodiment may optionally comprise that the key encryption key in the non-volatile memory of the tape cartridge is signed with a user private key associated with the user. The non-volatile memory of the tape cartridge includes a user public key. The operations in response to the non-volatile memory of the tape cartridge storing the key encryption key and the user public key comprise using the user public key to authenticate the signed key encryption key to produce the key encryption key. The decrypting the key encryption key is performed in response to authenticating the signed key encryption key.

With the above additional optional embodiment, the signing of the key encryption key and using the user public key to authenticate ensures to the tape drive that the key encryption key is provided by a genuine user. One the user that wrote the key encryption key to the tape cartridge is authenticated, the decryption of the key encryption key may proceed to produce the user encryption key, with the user being authenticated.

The first embodiment may further optionally include that the key encryption key comprises the user encryption key encrypted with a product specific public key associated with the tape drive. The key encryption key is decrypted with a product specific private key maintained in the tape drive to produce the user encryption key used to encrypt the plain-text data read from the tape medium.

With the above additional optional embodiment, the user may securely store the key encryption key in the tape cartridge that comprises the user encryption key encrypted with a product specific public key that only the tape drive can decrypt using the product specific secret key maintained by the tape drive. In this way, the user is ensured only the legitimate tape drive will be able to decrypt the key encryption key to obtain the user encryption key because only an authorized tape drive would have the product specific secret key.

The first embodiment may further optionally comprise receiving a read request for the plain-text data in the tape medium. In response to the read request, the encryption engine may use the user encryption key to encrypt the requested plain-text data from the tape medium to return the encrypted requested plain-text data to the read request.

With the above additional optional embodiment, although the tape cartridge stores plain-text data, the tape drive only returns encrypted data, encrypted with the user encryption data, to a read request to ensure that only the user that wrote the data to the cartridge can read and access the encrypted read data, because the plain-text data on the tape cartridge can only be decrypted by the user encryption key, safely maintained by the user.

The first embodiment may further optionally provide that the tape drive comprises a source tape drive, the tape cartridge comprises a source tape cartridge, and the tape medium comprises a source tape medium. Further, the read request comprises an operation to transfer encrypted plain-text data from the source tape medium to a destination tape medium in a destination tape cartridge coupled to a destination tape drive. In such case, the key encryption key is transferred from the source tape drive to the destination tape drive to store in the destination tape drive. The destination tape drive decrypts the transferred key encryption key to produce the user encryption key to use to decrypt the plain-text data transferred from the source tape drive to produce the plain-text data to write to the destination tape medium.

With the above additional embodiment, the encrypt read mode is used to transfer plain-text data encrypted from one or more source tape drives to a destination tape drive, where the destination tape drive has to decrypt to store the plain-text data on the tape media. This may be performed when upgrading the tape cartridge to a higher capacity destination tape cartridge. Further, the keys are copied from the source tape cartridge to the destination tape cartridge so the destination tape cartridge has the same encrypt read mode settings as the source tape cartridge. This allows the destination tape cartridge to be processed in the same manner as the source cartridge was processed. Yet further, this migration method enables safe reproduction of the content of the tape media 208 by encrypting the data before migrating to a new destination drive.

A second embodiment provides a computer program product, system, and method for managing access to tape cartridges at a tape archival service provider. Plain-text data is received from a user computer, associated with a user, to write to a tape medium of the tape cartridge. A product specific public key associated with the tape drive is sent to the user computer. A key encryption key is then received from the user computer comprising a user encryption key, associated with the user, encrypted with the product specific public key. The product specific public key and a product specific private key are maintained in the tape drive and are a pair of keys in a cryptographic system. The key encryption key is decrypted with the product specific private key to produce the user encryption key. The user encryption key is used to encrypt the plain-text data read from the tape medium to return to a read request.

With the above second embodiment, the user computer may provide a key encryption key encrypted with the tape drive product specific public key for the tape drive to now use with the tape cartridge. Encrypting the user encryption key with the product specific public key assures the user that only a legitimate tape drive including the product specific private key can access the user encryption key to encrypt plain-text data read from the tape drive.

The second embodiment may further optionally perform storing the key encryption key in a non-volatile memory of the tape cartridge. When detecting the tape cartridge being re-inserted into the tape drive after being ejected from the tape drive, the key encryption key is accessed from the non-volatile memory of the re-inserted tape cartridge. The accessed key encryption key is decrypted with the product specific private key to produce the user encryption key to use to encrypt plain-text data read from the tape medium.

With the above optional embodiment, the new key encryption key, which was stored in a non-volatile memory of the tape cartridge when received from the user, can now be accessed when the tape cartridge is re-inserted into the tape drive to cause the tape drive to access the new key encryption key stored in the tape cartridge to decrypt to produce the user encryption key to use to encrypt data to return to a read and decrypt data to write in plain-text.

The second embodiment may further optionally comprise that the received key encryption key comprises a first key encryption key and wherein the user encryption key comprises a first user encryption key. A determination is made whether the decrypting succeeded in producing the first user encryption key. The first key encryption key is stored in a non-volatile memory of the tape cartridge in response to the determining the decrypting succeeded in producing the user encryption key. The storing the first key encryption key overwrites a second key encryption key stored in the non-volatile memory of the tape cartridge, comprising a second user encryption key associated with the user and encrypted with the product specific public key. The second key encryption was stored in the non-volatile memory of the tape cartridge before the first key encryption key was received from the user.

With the above optional embodiment, the user provided first key encryption key is used to update and overwrite a previous key encryption key stored in the tape cartridge to use for future read and write operations when the tape cartridge is re-inserted into the tape drive. This allows the user to update the user encryption keys maintained in the tape cartridge use for future read and write operations to the storage cartridge.

DETAILED DESCRIPTION

Described embodiments provide improvements to computer technology for providing access to plain-text data on tape cartridges maintained by a tape archival service. Described embodiments provide security and encryption protocols to prevent unauthorized users from reading plain-text data on the tape cartridge by having the tape drive at the tape archival service access the user encryption key in a key encryption key maintained in the tape cartridge. This allows the tape drive to securely access the user encryption key through a series of encryption and signature operations to then use to encrypt data read from the tape cartridge to provide to a read request and decrypt encrypted write data provided to the tape drive to write to the tape cartridge. In this way, the tape drive ensures that plain-text data on the tape cartridge remains secure and protected by encrypting any external transfers of the data with an encryption key provided by a user that stored the data in the tape cartridge.

Further, by having the tape drive unwrap the user encryption key from the source tape cartridge, a source tape drive may migrate plain-text data on a source tape cartridge encrypted with the user encryption key obtained from the source tape cartridge to a destination tape cartridge as well as copying the key encryption key from the source tape drive to store in the destination tape cartridge. In this way, the destination tape cartridge can unwrap the same user encryption key from the key encryption key copied to the destination tape cartridge to decrypt the encrypted transferred data to store in the destination tape cartridge as plain-text. In this way, the tape drive at the tape archival service provider does not have to obtain the key from a key manager, but can instead obtain the key from the tape cartridge having the data to access or transfer.

Figure 1:
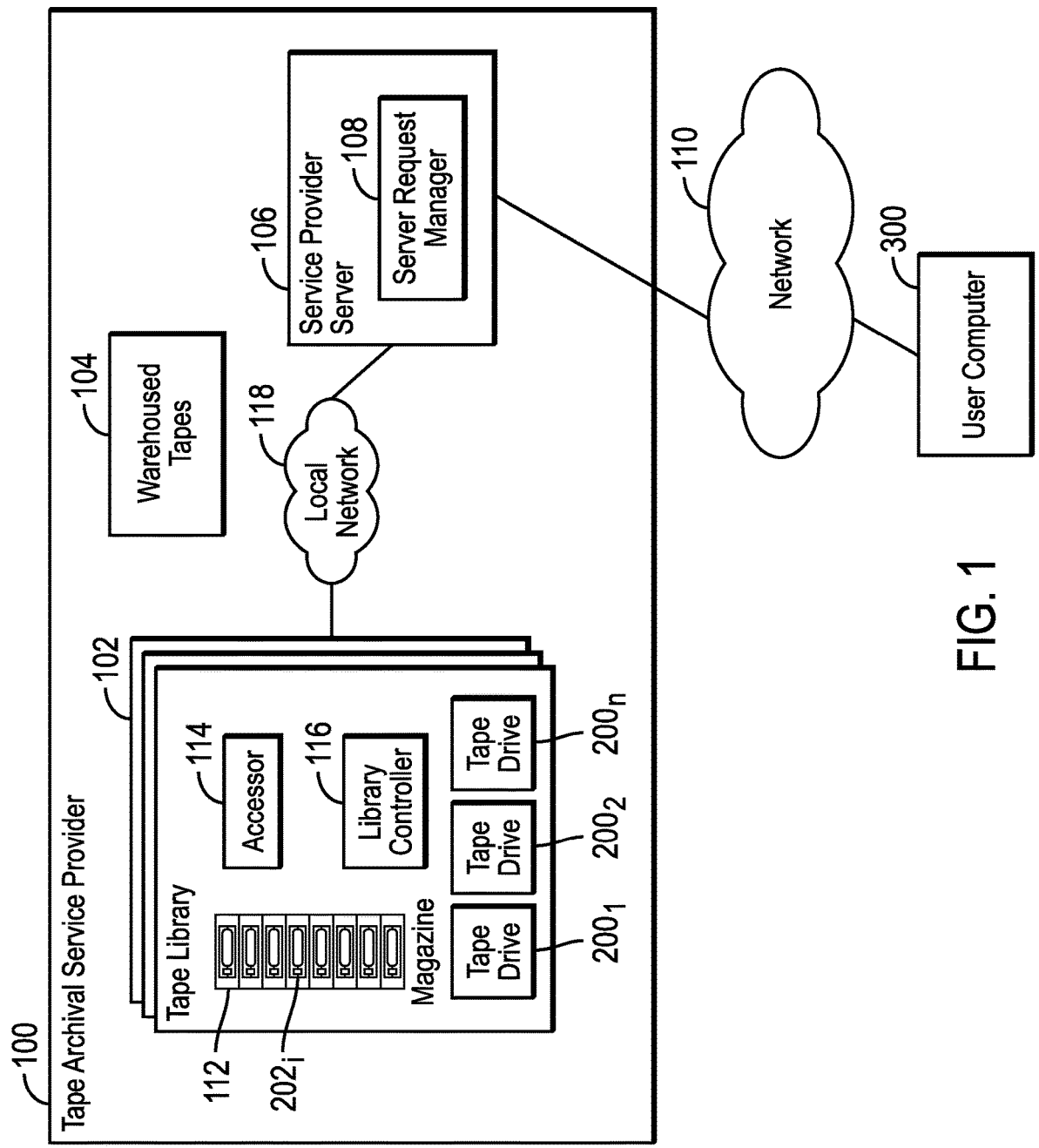
FIG. 1 illustrates an embodiment of a tape archival environment.

FIG. 1 illustrates an embodiment of a tape archival environment showing a tape archival service provider 100 facility having one or more tape libraries 102 and warehoused tapes 104 of tape cartridges $202_i$ (FIG. 2) provided by users or clients of the tape archival services offered by the service provider. A service provider server 106 includes a server request manager 108 to receive requests from user computers $300_i$ over a network 110 to access data in tape cartridges 202i the users sent to the tape archival service provider 100 to archive.

The tape library 102 includes a magazine 112 of tape cartridges $202_i$, an accessor 114 having a robot picker assembly to grab a tape cartridge in the magazine 112 and move to another magazine or storage slot or one of the tape drives $200_1, 200_2 \ldots 200_n$, and a bar code reader to read bar codes on the tape cartridge $202_i$ label; and a library controller 116 to receive requests for data in a tape cartridge and control the accessor 114 to load a tape cartridge $202_i$ and direct user read and write requests, from a user computer 300, to the tape drives $200_1, 200_2 \ldots 200_n$. The library controller 116 has information on cartridges $202_i$ at the different tape drives $200_1, 200_2 \ldots 200_n$, magazines 112, and the warehoused tapes 104. The service provider server 106 and tape libraries 102 may communicate over a local network 118 of the tape archival service provider 100.

Figure 2:
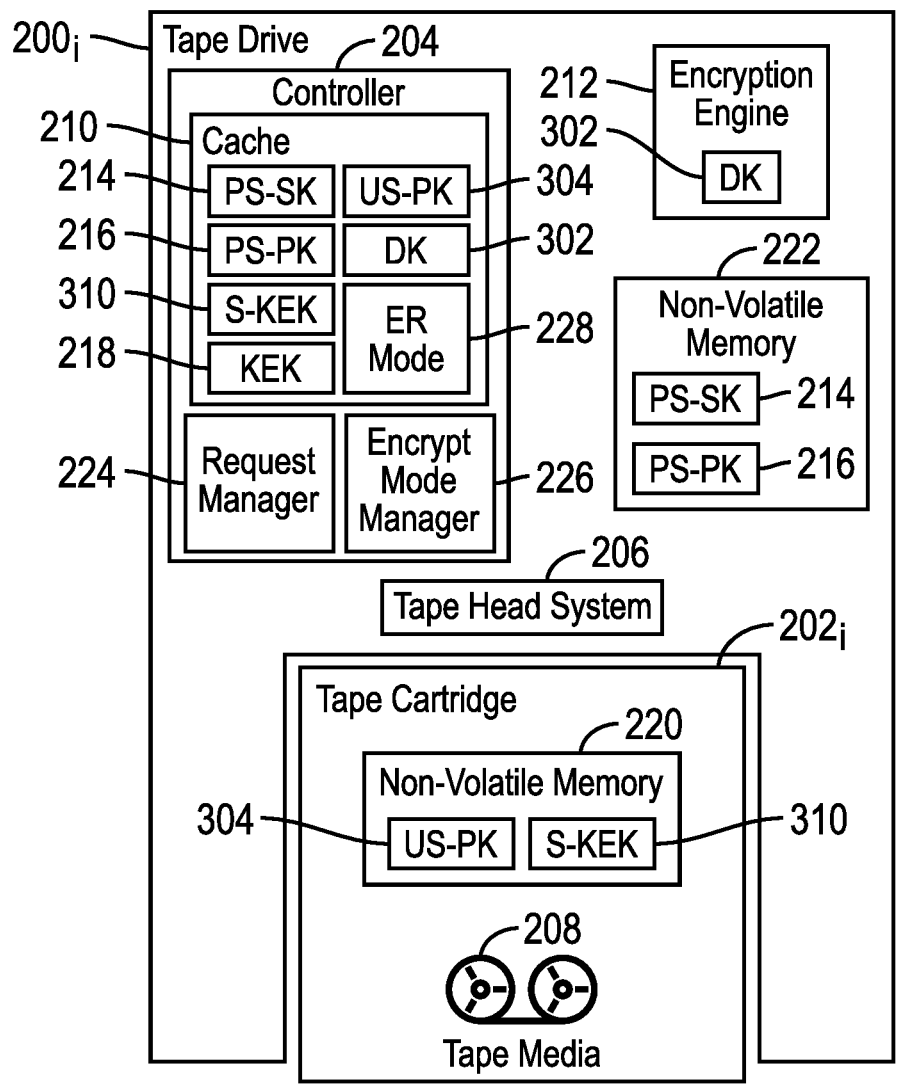
FIG. 2 illustrates an embodiment of a tape drive and tape cartridge.

FIG. 2 illustrates an embodiment of a tape drive $200_i$ including a controller 204 to receive read and write requests and control a tape head system 206 to read and write data with respect to a mounted tape storage media 208 in a tape cartridge $202_i$ loaded into the tape drive $200_i$. The controller 204 may buffer data for read and write requests in a cache 210, such that read data in tape media 208 is buffered in the cache 210 before being transferred to the service provider server 106 to return to the user computer $300_i$, and write data from a user computer $300_i$ is buffered before being written to the tape storage media 208. The tape drive $200_i$ further includes an encryption engine 212 into which a user encryption key DK 302, from the user computer $300_i$, is loaded to use to encrypt plain-text data read from the tape media 208 to return to a read request and decrypt received encrypted write data to write plain-text data to the tape media 208.

The cache 210 may buffer various keys used during the encryption process including: a product specific secret key (PS-SK) 214, e.g., a private key, and a product specific public key (PS-PK) 216 that are associated with the tape drive $200_i$ and are a pair of keys in a cryptographic system, such as a public key infrastructure; a user public key 304 received from the user computer $300_i$ that is part of a pair of keys, from a cryptographic system, including a user secret key 306, e.g., private key, stored in a non-volatile memory 308 of the user computer $300_i$; the user encryption key DK 302 provided from the user computer $300_i$; a key encryption key (KEK) 218 comprising the user encryption key (DK) 302 encrypted, at the user computer $300_i$, with the product specific public key 216; and a signed KEK-(S-KEK) 310 comprising the KEK 218 signed with the user private key 304 at the user computer $300_i$ and stored in a non-volatile memory 220 of the tape cartridge $202_i$, from where it is loaded into the cache 210 of the tape drive $200_i$. The user encryption key DK 302 may comprise an asymmetric key or a user encryption public key in a cryptographic system to encrypt data, where the user computer $300_i$ would maintain the user encryption private key of the pair to decrypt data encrypted by the user encryption public key. The tape cartridge $202_i$ non-volatile memory 220 further stores the US-PK 304 to use to verify the signature of the S-KEK 310, signed at the user computer $300_i$ with the US-SK 306.

The tape drive $200_i$ includes a non-volatile memory 222 to persistently store the PS-SK 214 and PS-PK 216, which are then loaded into the cache 210 to use during operations. The tape drive controller 204 includes a request manager 224 to manage read and write requests from users and an encrypt mode manager 226 to determine whether to set an encrypt read (ER) mode 228 to indicate that data read from the tape medium 208 is encrypted before returning data to a read request and the write data is decrypted before writing to the tape medium 208.

Figure 3:
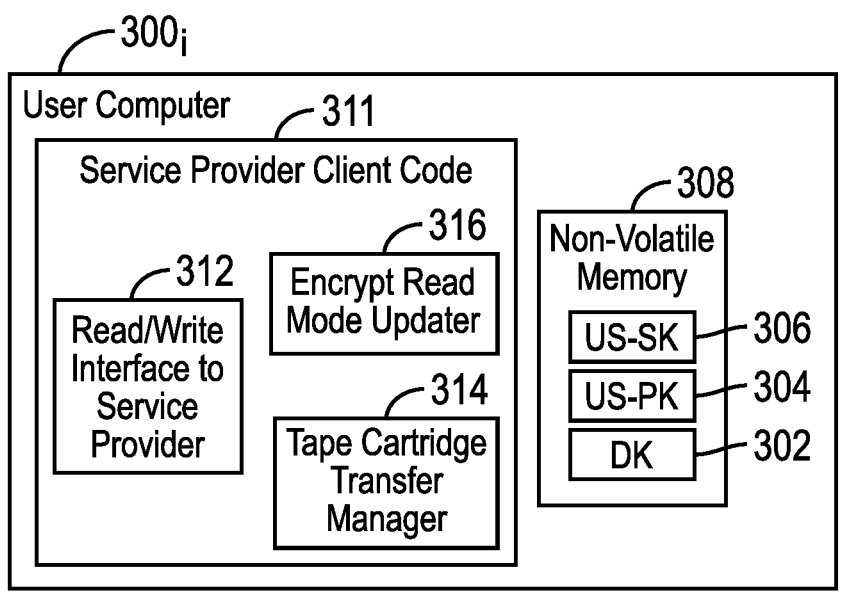
FIG. 3 illustrates an embodiment of a user computer to perform operations with respect to the tape drive and tape cartridge at a tape archival service provider.

The user computer $300_i$ of FIG. 3 may include service provider client code 311, such as a toolkit provided by the tape archival service provider to enable the user computer $300_i$ to interact with the service provider server 106, and includes read/write interface 312 to send read and write requests to a user tape cartridge $202_i$ maintained by the tape archive service provider 100; tape cartridge transfer manager 314 to prepare a tape cartridge $202_i$ for transfer to the tape archival service provider 100, such as by writing the S-KEK 310 and US-PK 304 to the tape cartridge $202_i$ non-volatile memory 220; and an encrypt read mode updater 316 to update the user encryption key DK $302_U$ used for a tape cartridge residing at the tape archival service provider 100. The tape cartridge transfer manager 314 may create the S-KEK 310 by first encrypting the user encryption key 302 with the PS-PK 216 to produce the KEK 218, i.e., KEK={DK}$_{PS-PK}$, and then signing the KEK 218 with the US-SK 306, i.e., S-KEK=[KEK]$_{US-SK}$.

In a further embodiment, the user may write the US-PK 304 and S-KEK 310 to the tape cartridge $202_i$ using native tape drive tools or a backup program at the user computer $300_i$ for a tape drive at the user computer $300_i$ to write to the tape cartridge $202_i$. In a further embodiment, the user may communicate requests to read or write data to the service provider server 106 through a web site provided by the tape archival service provider.

In alternative embodiments, the tape drive(s) may be connected directly to the service provider server or the user computer. In a further embodiment, the user computer may be connected directly to the local network 118 and communicate directly with the tape library 102, a tape drive directly connected to the local network 118, and/or the service provider server.

The controller 204 and encryption engine 212 may be comprised of code executed by a processor or implemented in hardware/firmware, such as separate Field Programmable Gate Arrays (FPGAs).

The tape cartridges $202_i$ may comprise magnetic tape cartridges, such as adhering to the Linear Tape Open (LTO)

format. In alternative embodiments, the portable tape cartridges may comprise other types of portable storage media, such as disk drives, static memory, flash memory, solid state storage devices (SSD), etc.

The non-volatile memories 222, 220, and 308 may comprise various types of storage devices, including magnetic hard disk drives, solid state storage devices (SSD) comprised of solid state electronics, The cache 210 in the tape drive $200_i$ may comprise a volatile memory, such as EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc.

The local network 118 may comprise one or more Local Area Networks (LAN), Storage Area Networks (SAN), etc. The network 110 may comprise a LAN, SAN, a Wide Area Network (WAN), the Internet, a peer-to-peer network, wireless network, etc.

The program components 108, 116, 204, 224, 226, 212, 310, 312, 314, 316 throughout the devices 102, 106, 108, $200_i$, and $300_i$ comprise program code loaded into a memory and executed by a processor. Alternatively, some or all of the components functions may be implemented in hardware devices, such as in Application Specific Integrated Circuits (ASICs), Field Programmable Gate Array (FPGA) or executed by separate dedicated processors. In one embodiment, the encryption engine 212 may be implemented as an FPGA card in the tape drive $200_i$ to manage encryption operations.

Figure 4:
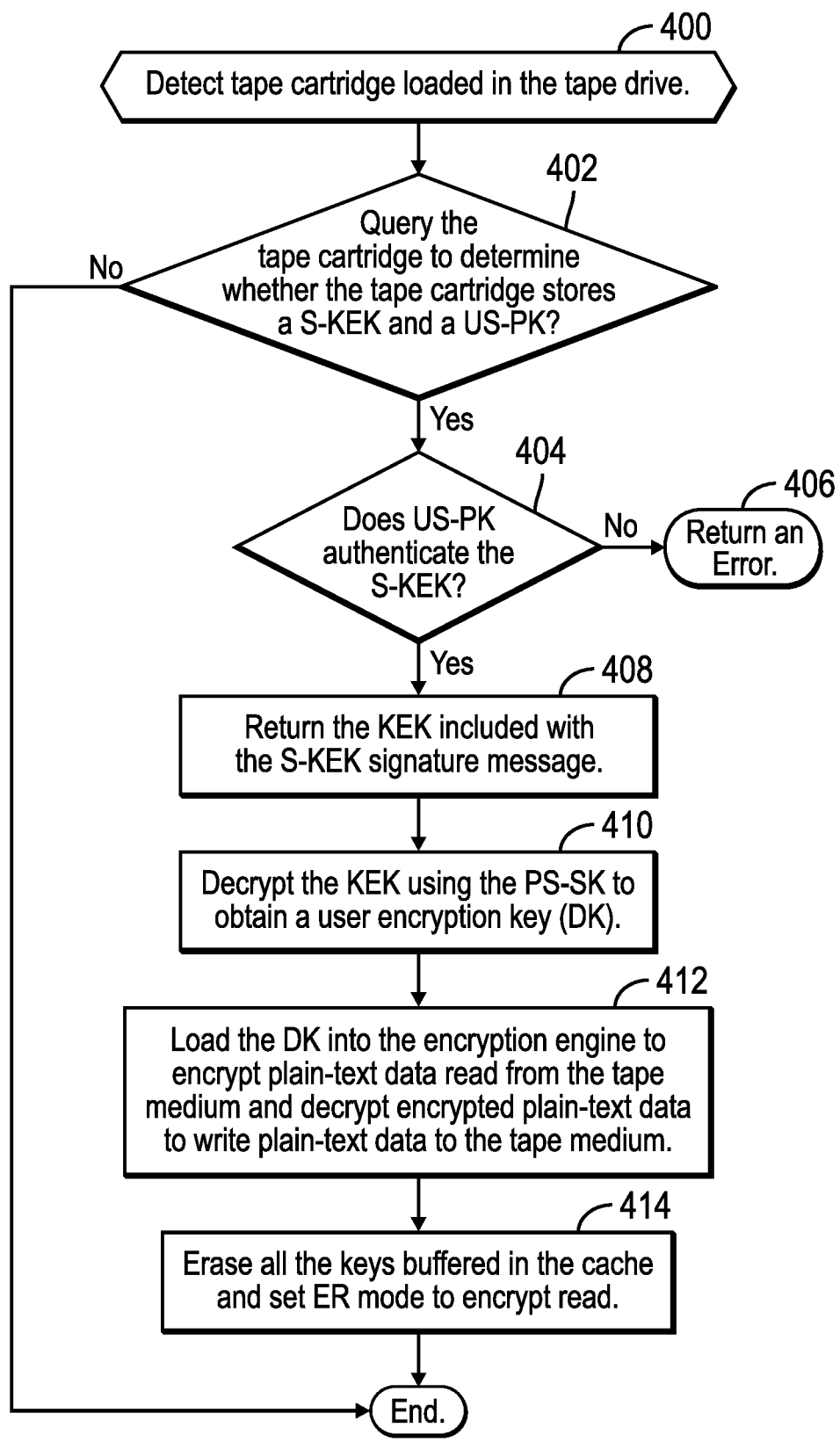
FIG. 4 illustrates an embodiment of operations performed when a tape cartridge is loaded in a tape drive to access a user encryption key.

FIG. 4 illustrates an embodiment of operations performed by the encrypt mode manager 226 when a tape cartridge $202_i$ is inserted into the tape drive $200_i$ opening to determine the user encryption key DK 302 needed for encryption operations. Upon detecting (at block 400) a tape cartridge $202_i$ loaded into the tape drive $200_i$, the encrypt mode manager 226 queries (at block 402) the detected tape cartridge $202_i$ to determine whether the tape cartridge stores an S-KEK 310 and a US-PK 304 in the non-volatile memory 220. If so, the S-KEK 310 and US-PK 304 are loaded into the cache 210 to use to authenticate (at block 404) the signature of the S-KEK 310 that it was signed at the user computer $300_i$ using the US-SK 306. The signature is verified with the US-PK 304 because the KEK 218 would be included with the signed S-KEK 310 to use to determine whether a hash of the KEK 218 matches the S-KEK 306 decrypted with the US-PK 304. If (at block 404) the signature of the S-KEK 310 cannot be authenticated, then an error is returned (at block 406). If (at block 404) the signature of the S-KEK 310 can be authenticated, then the KEK 218 is returned (at block 408) as authenticated from the user. The KEK 218 is then decrypted (at block 410) using the PS-SK 214 to obtain the user encryption key DK 302. All used keys 214, 310, 218, 304 are all retained in the cache 210 during operations. The DK 302 is loaded (at block 412) into the encryption engine 212 to use encrypt plain-text data read from the tape medium 208 and decrypt encrypted plain-text data to write plain-text data to the tape medium 208. After obtaining the user encryption key DK 302 for the encryption engine 212, all the keys 214, 216, 310, 218, 304, 302 are erased (at block 414) from the cache 210 and the ER mode 228 is set to encrypt-read.

With the operations of FIG. 4, if the tape cartridge $202_i$ includes the S-KEK 310 and US-PK 304, then the controller 204 may automatically extract the user encryption key DK 302 to use in encrypt read mode while the tape cartridge is loaded in the tape drive $200_i$.

Figure 5:
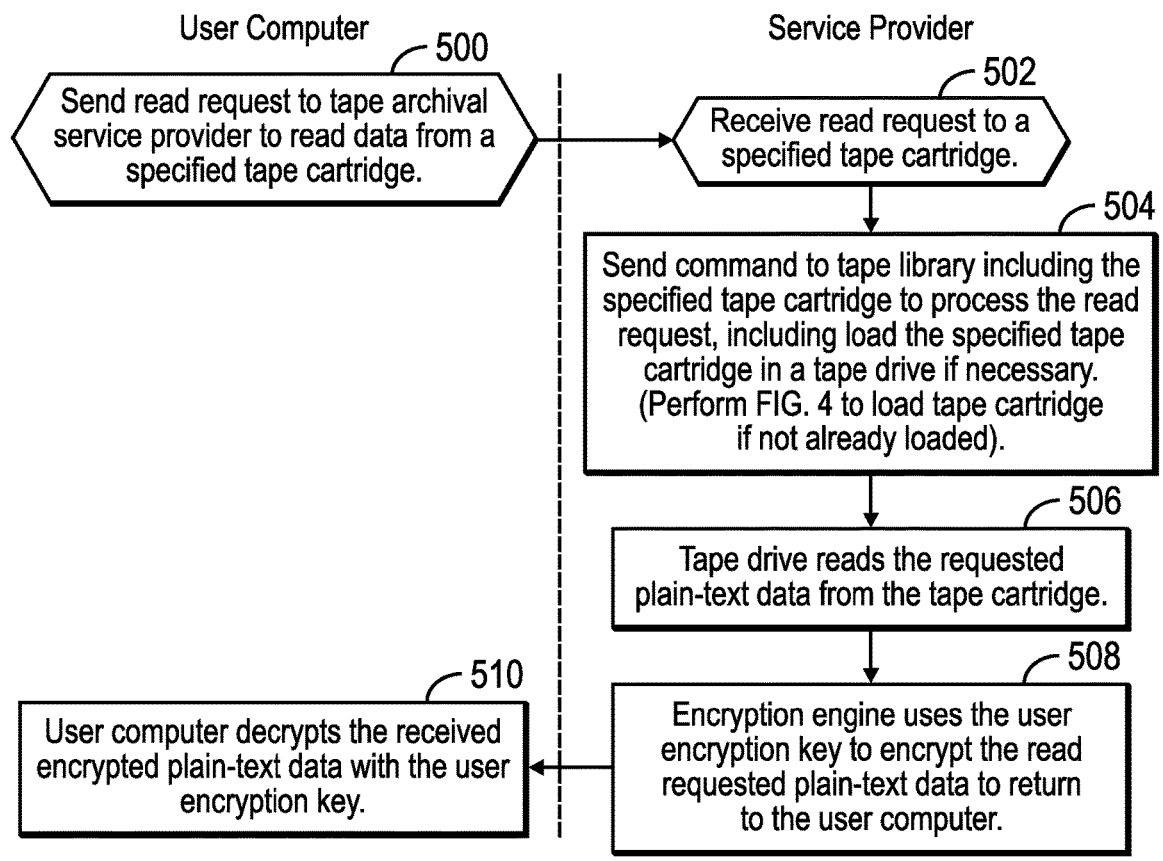
FIG. 5 illustrates an embodiment of operations performed by a tape archival service provider to process a user request to read data from a user tape cartridge sent to the tape archival service provider.

FIG. 5 illustrates an embodiment of operations performed by the read/write interface to service provider 312 module at the user computer $300_i$, the server request manager 108, and the request manager 224 at the tape drive $200_i$ to process read requests from the user computer $300_i$ for data stored in a specified tape cartridge $202_i$. The read/write interface 312 at the user computer $300_i$ sends (at block 500) a read request to the service provider server 106 to read data from a specified tape cartridge $202_i$ at the tape archival facility Upon receiving (at block 502) the read request, the service provider server 106 sends (at block 504) a command to the tape library 102 including the specified tape cartridge $202_i$ to process the read request, including load the specified tape cartridge $202_i$ in a tape drive $200_i$ if necessary and perform operations of FIG. 4 if the tape cartridge $202_i$ is not already loaded. The tape drive request manager 224 reads the requested plain-text data from the tape storage media 208 and sends the read data to the encryption engine 212 to use (at block 508) the user encryption key DK 302 to encrypt the read requested plain-text data on the tape medium 208 to return to the user computer $300_i$ that initiated the request. Upon receiving the encrypted plain-text data, the read/write interface 312 may use the user encryption key DK 302 to decrypt the encrypted data to provide the plain-text data to the user.

Figure 6:
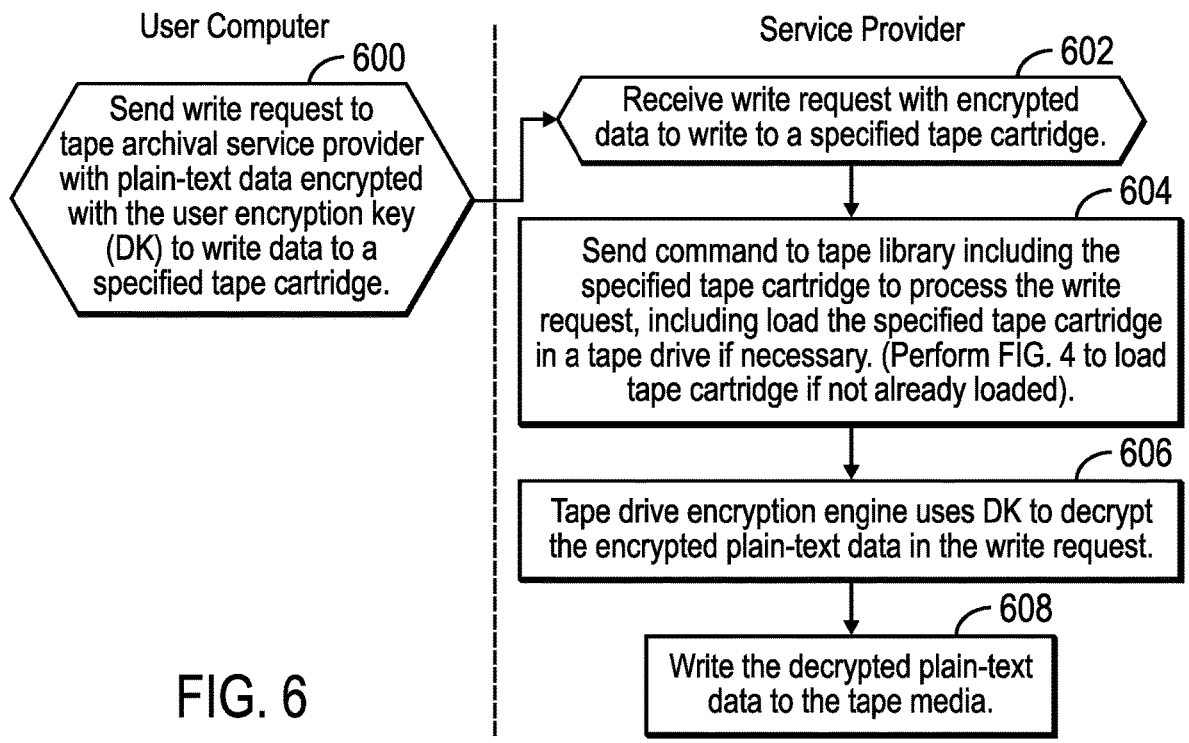
FIG. 6 illustrates an embodiment of operations performed by a tape archival service provider to process a user request to write data to a user tape cartridge sent to the tape archival service provider.

FIG. 6 illustrates an embodiment of operations performed by the read/write interface to service provider 312 module at the user computer $300_i$, the server request manager 108, and the request manager 224 at the tape drive $200_i$ to process write requests from the user computer $300_i$ having data encrypted with the user encryption key DK 302 to write to the tape media 208 in a specified tape cartridge $202_i$. The read/write interface sends (at block 600) a write request to the tape archival service provider 100 with plain-text data encrypted with the user encryption key (DK) 302 to write to a specified tape cartridge. Upon receiving (at block 602) the write request with encrypted data, the server request manager 108 sends (at block 604) a command to the tape library 102 including the specified tape cartridge 202i to process the write request, including load the specified tape cartridge 202i in a tape drive 200i if necessary and perform operations of FIG. 4 if the tape cartridge 202i is not already loaded. The tape drive encryption engine 212 uses (at block 606) the user encryption key DK 302 to decrypt the encrypted write data to write (at block 608) the decrypted plain-text write data to the tape media 208.

With the embodiments of FIGS. 5 and 6, data is stored in plain-text in the tape cartridge 202 at the tape archival facility. However, if there is any attempt to read the data, then the tape drive $200_i$ is configured to only return requested data encrypted with the user encryption key 302 of the user that provided in the tape cartridge $202_i$ to archive. This ensures safe transfer of data from the tape media 208. Further, to ensure plain-text data is written to the tape media 208, the tape drive $200_i$ decrypts encrypted write data to write the data as plain-text to the tape cartridge $202_i$. By storing the data as plain-text, the user may change the user encryption key 302 without having to decrypt and re-encrypt all the data on the tape media 208.

Figure 7:
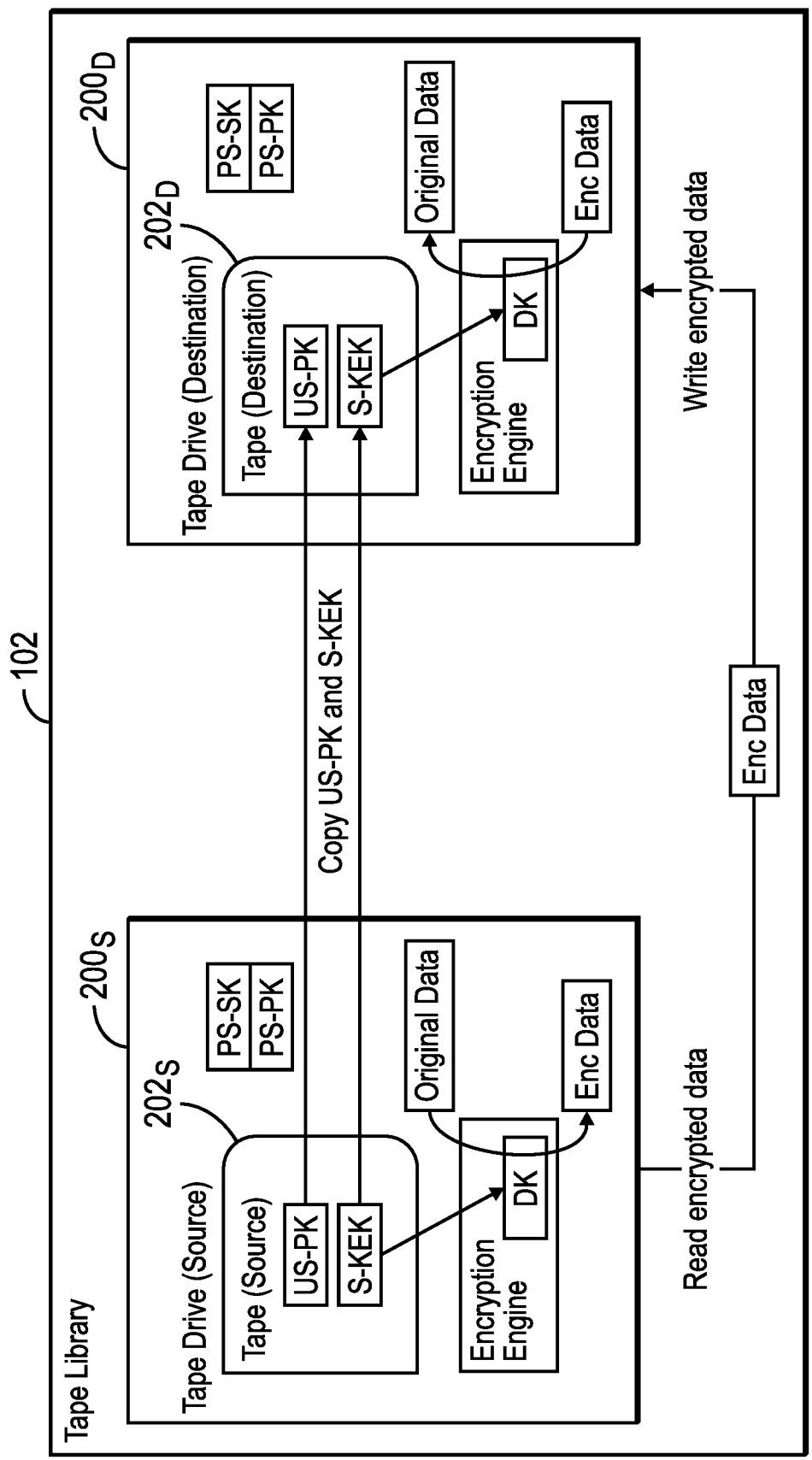
FIG. 7 illustrates an embodiment of an arrangement of a source tape drive and destination tape drive in a tape library to migrate data from one or more source tapes to a destination tape in the destination tape drive.
Figure 8:
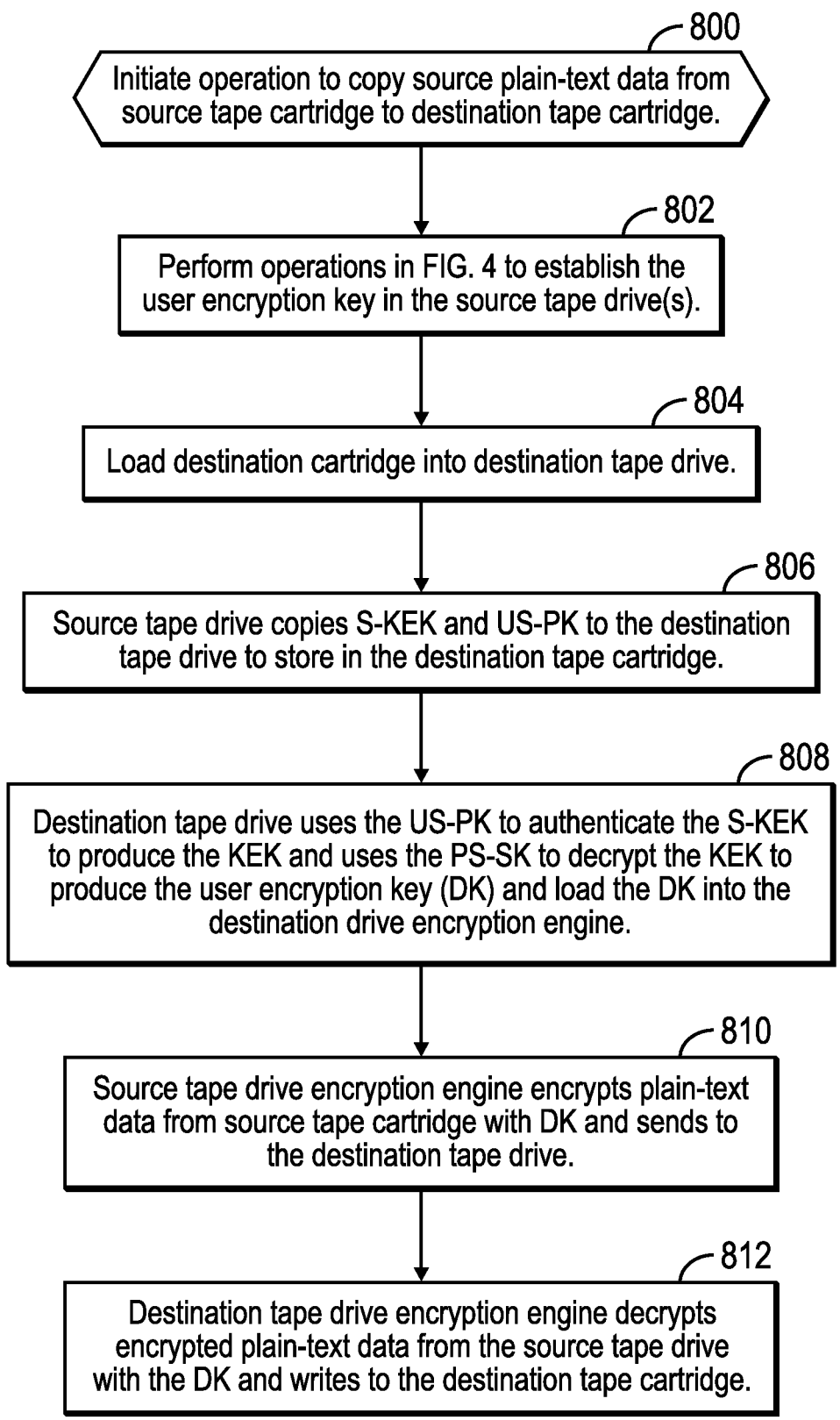
FIG. 8 illustrates an embodiment of operations to copy data from a source tape cartridge in a source tape drive to a destination tape cartridge in a destination tape drive.

FIGS. 7 and 8 are an embodiment where the encrypt mode is use for requests to read data as part of migrating data from one or more source tape cartridges $202_S$ to a destination tape cartridge $202_D$. FIG. 7 shows an arrangement in a tape library 102 having a source tape drive $200_S$ and destination tape drive $200_D$, which may be in the same or different tape libraries 102. Other of the keys and components of FIG. 2 are also shown in the tape drives $200_S$, $200_D$.

FIG. 8 illustrates an embodiment of operations to copy all the data in the tape media in one or more source tape cartridges $202_S$ to a destination tape cartridge $202_D$. Upon initiating (at block 800) an operation to migrate/copy data from a source tape cartridge $202_S$ to a destination tape cartridge $202_D$, the source tape drive $200_S$ performs (at block 802) the operations in FIG. 4 to establish the user encryption key DK 302 in the encryption engine 212. A destination cartridge $202_D$ is loaded (at block 804) in the destination tape drive $200_D$. The source tape drive $200_S$ copies (at block 806) the S-KEK 310 and US-PK 304 in the non-volatile memory 220 of the source tape cartridge $202_S$ to the destination tape drive $200_D$ to store in the destination tape cartridge $202_D$, as shown in FIG. 7.

The destination tape drive $200_D$ uses (at block 808) the US-PK 304 to authenticate the signed S-KEK 310 and uses the PS-SK 214 to decrypt the KEK 218 to produce the user encryption key DK 302 and load the DK 302 into the encryption engine 212 in the destination tape drive $200_D$, as described with respect to FIG. 4. The source tape drive $200_S$ encryption engine 212 encrypts (at block 810) plain-text data from source tape cartridge with the DK 302 and sends to the destination tape drive $200_D$. The destination tape drive $200_D$ encryption engine 212 decrypts the encrypted plain-text data from the source tape drive $200_S$ with the DK 302, and writes to the destination tape cartridge $202_D$.

The embodiment of FIGS. 7 and 8 utilize the encrypt read mode to transfer plain-text data encrypted from one or more source tape drives to a destination tape drive, where the destination tape drive has to decrypt to store the plain-text data on the tape media 208. This may be performed when upgrading the tape cartridge $202_S$ to a higher capacity destination tape cartridge $202_D$. Further, the keys 304, 310 are copied from the source tape cartridge $202_S$ to the destination tape cartridge $202_D$ so the destination tape cartridge $202_D$ has the same encrypt read mode settings as the source tape cartridge $202_S$. This allows the destination tape cartridge $202_D$ to be processed in the same manner as the source cartridge $202_S$ was processed. Yet further, this migration method enables safe reproduction of the content of the tape media 208 by encrypting the data before migrating to a new destination drive.

Figure 9:
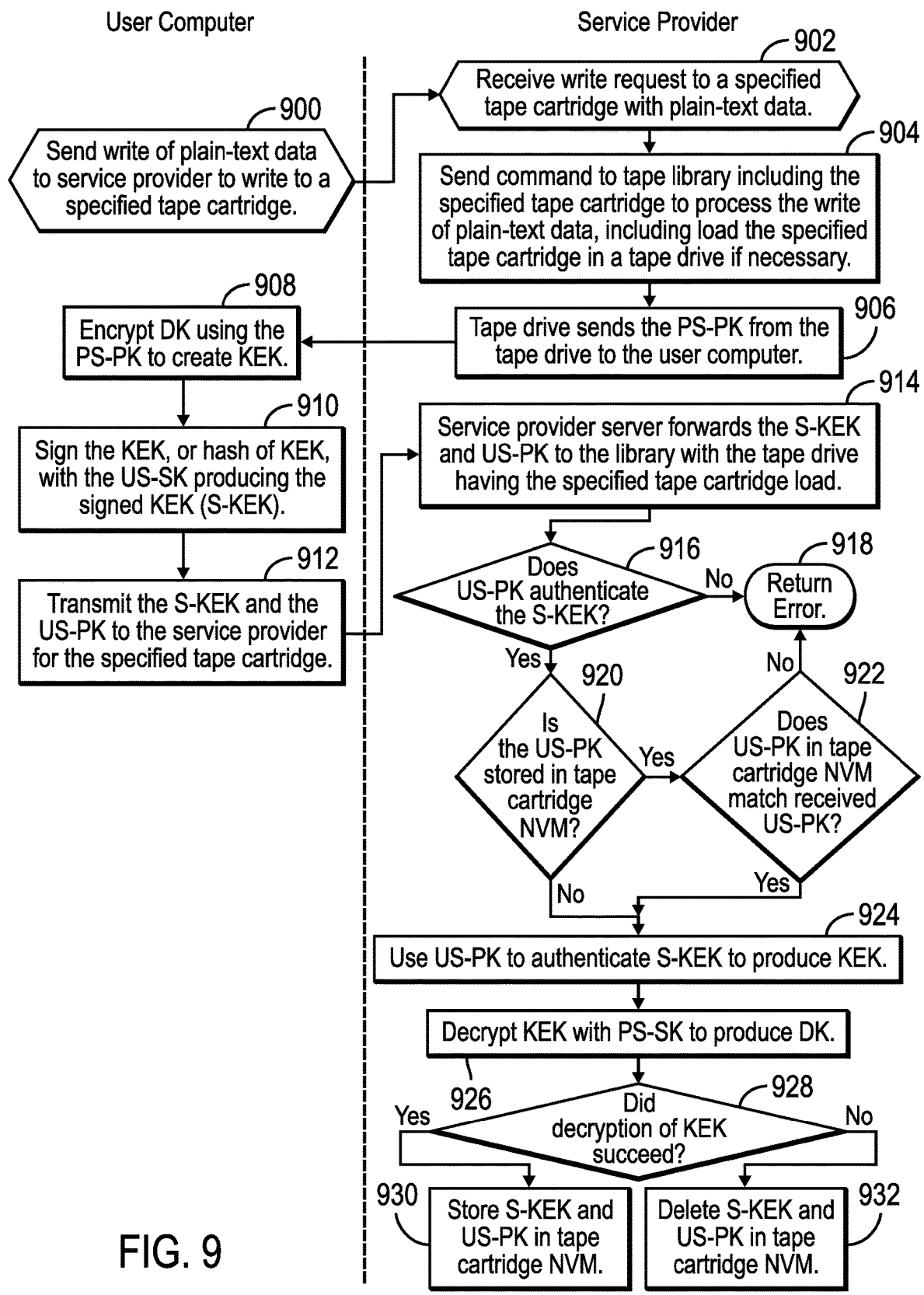
FIG. 9 illustrates an embodiment of operations performed by user computer and the tape archival service provider to update the user encryption key used for a tape cartridge at the tape archival service provider.

FIG. 9 illustrates an embodiment of operations of the encrypt read mode updater 316 of the user computer $300_i$ and encrypt mode manager 226 in tape drive $200_i$ to provide a new user encryption key DK $302_N$ for the tape drive $200_i$ to use and update the S-KEK 310 in the tape cartridge $202_i$ with the new S-KEK $310_N$. To program a new user encryption key $302_N$, the encrypt read mode updater 316 at the user computer $300_i$ sends (at block 900) a write of plain-text data to the service provider 300 to write to a specified tape cartridge $202_i$. Upon receiving (at block 902) the write request of plain-text data, the service provider server 106 sends (at block 904) a command to the tape library 102 indicating the specified tape cartridge $202_i$ to process the write of plain-text data, including load the specified tape cartridge in a tape drive if necessary and perform operations of FIG. 4. In response to receiving this write request of plain-text data to update the encrypt read mode, the tape drive $200_i$ sends (at block 906) the PS-PK 216 to the user computer $300_i$ to use to provide a new user encryption key $302_N$.

Upon the user computer $300_i$ receiving the PS-PK 216, the encrypt read mode updater 316 encrypts (at block 908) the new DK $302_N$, which may comprise a newly generated DK to replace the existing one in the tape cartridge $202_i$, and encrypts the new DK $302_N$ to create a new KEK $218_N$. The new KEK $218_N$, or a hash of the new KEK $218_N$, is signed (at block 910) with the US-SK 306 to produce the new signed S-KEK $310_N$. The new S-KEK $310_N$ and US-PK 304 are transmitted (at block 912) to the service provider server 106 for the specified tape cartridge $202_i$ to update the S-KEK 310 in the tape cartridge $202_i$ non-volatile memory 220 at the tape archival service provider.

Alternatively, the user may initiate re-keying through a web interface at the service provider server 106 by transmitting the new S-KEK $310_N$ and the US-PK 304 and indicating the tape cartridge to update with the new S-KEK 310.

The service provider server 106 forwards (at block 914) over the local network 118 the received new S-KEK $218_N$ and US-PK 304 to the tape library 102 with the tape drive $200_i$ having the specified tape cartridge $202_i$ to reprogram. The tape drive encrypt mode manager 226 determines (at block 916) whether the US-PK 304 authenticates the signed S-KEK $310_N$. If not, an error is returned (at block 918). If authenticated, then the encrypt mode manager 226 determines (at block 920) whether the US-PK 304 is currently stored in the non-volatile memory (NVM) 220 of the tape cartridge $202_i$. If so and if (at block 922) the US-PK 304 in the tape cartridge $202_i$ matches the received US-PK, then the encrypt mode manager 226 uses (at block 924) the received US-PK 304 to authenticate the new S-KEK $310_N$ to produce the new KEK $218_N$. If (at block 922) there is no match, then an error is returned (at block 918). The new KEK $218_N$ is decrypted (at block 926) with the PS-SK 214 to produce the new user encryption key DK $302_N$. If (at block 928) the decryption was successful, such as decryption did not result in a NULL key, then the received S-KEK $310_N$ and US-PK 304 are stored in the non-volatile memory 220 of the tape cartridge $202_i$ for subsequent use when the tape cartridge $202_i$ is ejected and loaded into a tape drive. The user encryption key DK $302_N$ may be loaded into the encryption engine 212 to use for encryption operations while the tape cartridge $202_i$ is loaded into the tape drive $200_i$. If (at block 928) decryption did not succeed, i.e., resulted in the NULL key, then the S-KEK 310 and US-PK 304 in the tape cartridge $202_i$ non-volatile memory 220 are deleted (at block 932).

With the embodiment of FIG. 9, the user may specify a new user encryption key in a signed S-KEK $310_N$ to transmit to the service provider server 106 to update the user encryption key used in the tape drive $200_i$ and update the S-KEK 310 in the tape cartridge $202_i$ to store the new S-KEK $310_N$ for use in the same or different tape drives. This allows the user to update the user encryption keys and the S-KEK $310_N$ maintained in the tape cartridge $202_i$ to use for future read and write operations to the storage cartridge.

The present invention may be a system, a method, and/or a computer program product. The computer program product may include a computer readable storage medium (or media) having computer readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 1000 contains an example of an environment for the execution of at least some of the computer code 1001 involved in performing the inventive methods, such as server request manager 108 in FIG. 2. The service provider server 106 may be implemented in computer 1001 and communicate over WAN 1002.

In addition to block 1001, computing environment 1000 includes, for example, computer 1001, wide area network (WAN) 1002, end user device (EUD) 1003, remote server 1004, public cloud 1005, and private cloud 1006. In this embodiment, computer 1001 includes processor set 1010 (including processing circuitry 1020 and cache 1021), communication fabric 1011, volatile memory 1012, persistent storage 1013 (including operating system 1022 and block 1001, as identified above), peripheral device set 1014 (including user interface (UI) device set 1023, storage 1024, and Internet of Things (IOT) sensor set 1025), and network module 1015. Remote server 1004 includes remote database 1030. Public cloud 1005 includes gateway 1040, cloud orchestration module 1041, host physical machine set 1042, virtual machine set 1043, and container set 1044.

Figure 10:
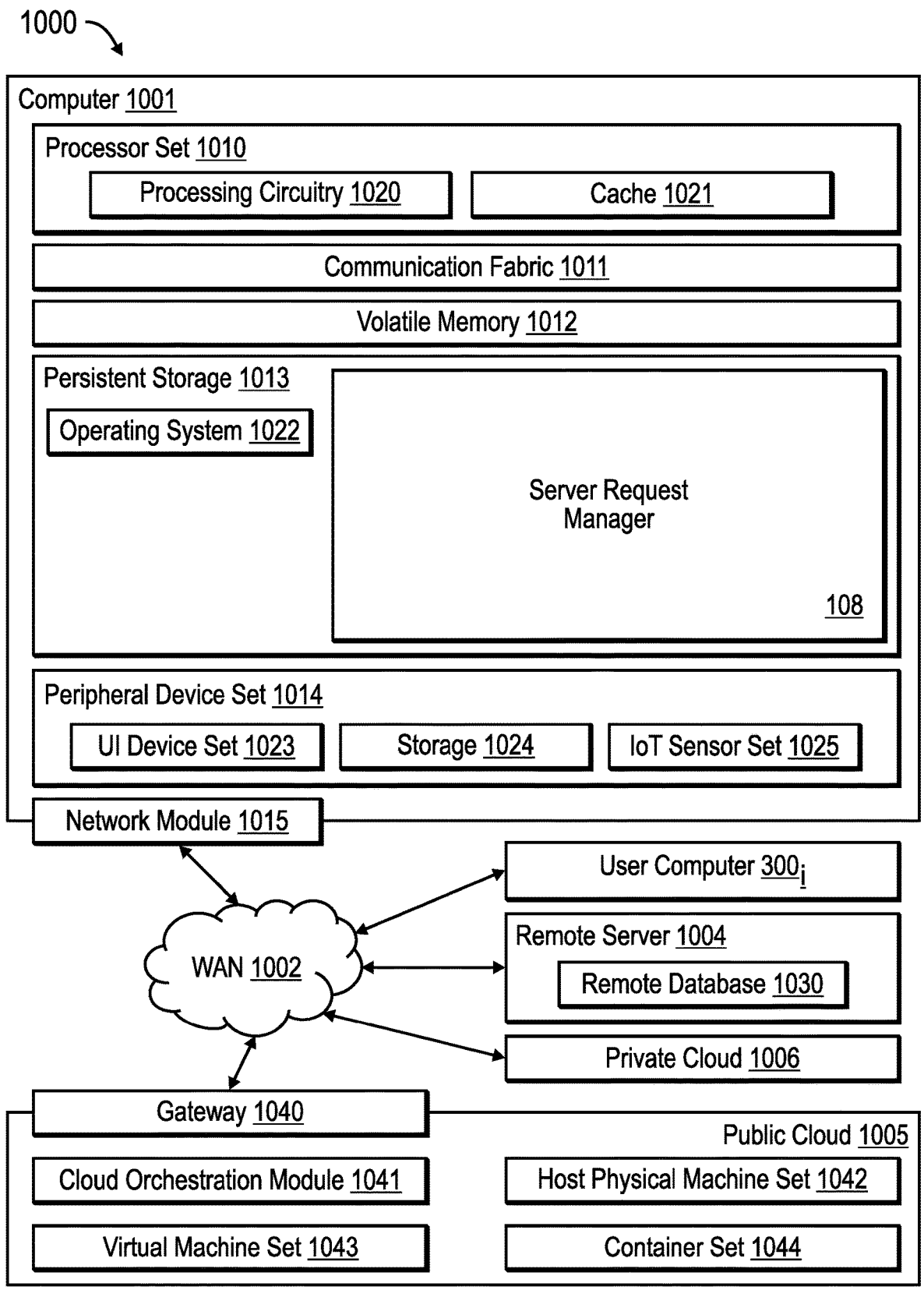
FIG. 10 illustrates a computing environment in which the components of FIGS. 1 and 2 may be implemented.

COMPUTER 1001 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1030. As is well understood in the art of computer technology, and depending upon the technology, performance of a computer-implemented method may be distributed among multiple computers and/or between multiple locations. On the other hand, in this presentation of computing environment 1000, detailed discussion is focused on a single computer, specifically computer 1001, to keep the presentation as simple as possible. Computer 1001 may be located in a cloud, even though it is not shown in a cloud in FIG. 10. On the other hand, computer 1001 is not required to be in a cloud except to any extent as may be affirmatively indicated.

PROCESSOR SET 1010 includes one, or more, computer processors of any type now known or to be developed in the future. Processing circuitry 1020 may be distributed over multiple packages, for example, multiple, coordinated integrated circuit chips. Processing circuitry 1020 may implement multiple processor threads and/or multiple processor cores. Cache 1021 is memory that is located in the processor chip package(s) and is typically used for data or code that should be available for rapid access by the threads or cores running on processor set 1010. Cache memories are typically organized into multiple levels depending upon relative proximity to the processing circuitry. Alternatively, some, or all, of the cache for the processor set may be located "off chip." In some computing environments, processor set 1010 may be designed for working with qubits and performing quantum computing.

Computer readable program instructions are typically loaded onto computer 1001 to cause a series of operational steps to be performed by processor set 1010 of computer 1001 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1021 and the other storage media discussed below. The program instructions, and associated data, are accessed by processor set 1010 to control and direct performance of the inventive methods. In computing environment 1000, at least some of the instructions for performing the inventive methods may be stored in persistent storage 1013.

COMMUNICATION FABRIC 1011 is the signal conduction path that allows the various components of computer 1001 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1012 is any type of volatile memory now known or to be developed in the future. Examples include dynamic type random access memory (RAM) or static type RAM. Typically, volatile memory 1012 is characterized by random access, but this is not required unless affirmatively indicated. In computer 1001, the volatile memory 1012 is located in a single package and is internal to computer 1001, but, alternatively or additionally, the volatile memory may be distributed over multiple packages and/or located externally with respect to computer 1001.

PERSISTENT STORAGE 1013 is any form of non-volatile storage for computers that is now known or to be developed in the future. The non-volatility of this storage means that the stored data is maintained regardless of whether power is being supplied to computer 1001 and/or directly to persistent storage 1013. Persistent storage 1013 may be a read only memory (ROM), but typically at least a portion of the persistent storage allows writing of data, deletion of data and re-writing of data. Some familiar forms of persistent storage include magnetic disks and solid state storage devices. Operating system 1022 may take several forms, such as various known proprietary operating systems or open source Portable Operating System Interface-type operating systems that employ a kernel. The code included in block 1001 typically includes at least some of the computer code involved in performing the inventive methods, such as the server request manager 108 of FIG. 1.

PERIPHERAL DEVICE SET 1014 includes the set of peripheral devices of computer 1001. Data communication connections between the peripheral devices and the other components of computer 1001 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 1023 may include components such as a display screen, speaker, microphone, wearable devices (such as goggles and smart watches), keyboard, mouse, printer, touchpad, game controllers, and haptic devices. Storage 1024 is external storage, such as an external hard drive, or insertable storage, such as an SD card. Storage 1024 may be persistent and/or volatile. In some embodiments, storage 1024 may take the form of a quantum computing storage device for storing data in the form of qubits. In embodiments where computer 1001 is required to have a large amount of storage (for example, where computer 1001 locally stores and manages a large database) then this storage may be provided by peripheral storage devices designed for storing very large amounts of data, such as a storage area network (SAN) that is shared by multiple, geographically distributed computers. IoT sensor set 1025 is made up of sensors that can be used in Internet of Things applications. For example, one sensor may be a thermometer and another sensor may be a motion detector.

NETWORK MODULE 1015 is the collection of computer software, hardware, and firmware that allows computer 1001 to communicate with other computers through WAN 1002. Network module 1015 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1015 are performed on the same physical hardware device. In other embodiments (for example, embodiments that utilize software-defined networking (SDN)), the control functions and the forwarding functions of network module 1015 are performed on physically separate devices, such that the control functions manage several different network hardware devices. Computer readable program instructions for performing the inventive methods can typically be downloaded to computer 1001 from an external computer or external storage device through a network adapter card or network interface included in network module 1015.

WAN 1002 is any wide area network (for example, the internet) capable of communicating computer data over non-local distances by any technology for communicating computer data, now known or to be developed in the future. In some embodiments, the WAN 1002 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

USER COMPUTER $300_i$ is any computer system that is used and controlled by an end user (for example, a customer of an enterprise that operates computer 1001), and may take any of the forms discussed above in connection with computer 1001, but with the service provider client code 311. User computer $300_i$ typically sends read and write requests to the service provider server 106, and other related commands to the computer 1001, implementing the server provider server 106. For example, in a hypothetical case where computer 1001 is designed to return read data from a tape cartridge to the user computer $300_i$ this read data would typically be communicated from network module 1015 of computer 1001 through WAN 1002 to user computer $300_i$. In this way, user computer $300_i$ can receive requested data from an archived tape cartridge $202_i$. In some embodiments, user computer $300_i$ may be a client device, such as thin client, heavy client, mainframe computer, desktop computer and so on.

REMOTE SERVER 1004 is any computer system that serves at least some data and/or functionality to computer 1001. Remote server 1004 may be controlled and used by the same entity that operates computer 1001. Remote server 1004 represents the machine(s) that collect and store helpful and useful data for use by other computers, such as computer 1001. For example, in a hypothetical case where computer 1001 is designed and programmed to provide a recommendation based on historical data, then this historical data may be provided to computer 1001 from remote database 1030 of remote server 1004.

PUBLIC CLOUD 1005 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 1005 is performed by the computer hardware and/or software of cloud orchestration module 1041. The computing resources provided by public cloud 1005 are typically implemented by virtual computing environments that run on various computers making up the computers of host physical machine set 1042, which is the universe of physical computers in and/or available to public cloud 1005. The virtual computing environments (VCEs) typically take the form of virtual machines from virtual machine set 1043 and/or containers from container set 1044. It is understood that these VCEs may be stored as images and may be transferred among and between the various physical machine hosts, either as images or after instantiation of the VCE. Cloud orchestration module 1041 manages the transfer and storage of images, deploys new instantiations of VCEs and manages active instantiations of VCE deployments. Gateway 1040 is the collection of computer software, hardware, and firmware that allows public cloud 1005 to communicate through WAN 1002.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1006 is similar to public cloud 1005, except that the computing resources are only available for use by a single enterprise. While private cloud 1006 is depicted as being in communication with WAN 1002, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1005 and private cloud 1006 are both part of a larger hybrid cloud.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product implemented in a tape drive in which a tape cartridge is coupled including a non-volatile memory and tape medium, the computer program product comprising a computer readable storage medium having computer readable program code embodied therein that is executable to perform operations, the operations comprising:
    determining whether the non-volatile memory of the tape cartridge stores a key encryption key comprising an user encryption key associated with a user that is encrypted with a public key of a private key and public key pair; and
    in response to determining that the non-volatile memory of the tape cartridge stores the key encryption key, performing:
        decrypting the key encryption key with the private key to produce the user encryption key; and
        providing the user encryption key, resulting from the decrypting, to an encryption engine of the tape drive to encrypt plain-text data read from the tape medium in the tape cartridge with the user encryption key to return to a read request.

2. The computer program product of claim 1, wherein the key encryption key in the non-volatile memory of the tape cartridge is signed with a user private key associated with the user, wherein the non-volatile memory of the tape cartridge includes a user public key, wherein the operations in response to the non-volatile memory of the tape cartridge storing the key encryption key and the user public key comprise:
    using the user public key to authenticate the signed key encryption key to produce the key encryption key, wherein the decrypting the key encryption key is performed in response to authenticating the signed key encryption key.

3. The computer program product of claim 1, wherein the public key that encrypts the user encryption key to produce the key encryption key comprises a product specific public key associated with the tape drive, wherein the private key that decrypts the key encryption key comprises a product specific private key maintained in the tape drive to produce the user encryption key used to encrypt the plain-text data read from the tape medium.

4. The computer program product of claim 1, wherein the operations further comprise:
    receiving a read request for the plain-text data in the tape medium; and
    in response to the read request, using, by the encryption engine, the user encryption key to encrypt the requested plain-text data from the tape medium to return the encrypted requested plain-text data to the read request.

5. The computer program product of claim 1, wherein the operations further comprise:
receiving a write request including encrypted write plain-text data encrypted with the user encryption key to write to the tape medium;
in response to the write request, using, by the encryption engine, the user encryption key to decrypt the encrypted write plain-text data to produce the write plain-text data; and
writing the write plain-text data to the tape medium.

6. The computer program product of claim 1, wherein the operations further comprise:
in response to the decrypting the key encryption key producing a valid encryption key, indicating an encrypt-read mode for the tape cartridge, wherein the encryption engine uses the user encryption key to encrypt plain-text data read from the tape medium in the tape cartridge to return to a read request when the encrypt-read mode is set.

7. The computer program product of claim 1, wherein the read request is from the user, wherein a user computer, associated with the user, uses the user encryption key to decrypt the encrypted plain-text data returned to the read request.

8. The computer program product of claim 1, wherein the tape drive comprises a source tape drive, the tape cartridge comprises a source tape cartridge, and the tape medium comprises a source tape medium, and wherein the read request comprises an operation to transfer encrypted plain-text data from the source tape medium to a destination tape medium in a destination tape cartridge coupled to a destination tape drive, wherein the operations further comprise:
transferring the key encryption key from the source tape drive to the destination tape drive to store in the destination tape drive, wherein the destination tape drive decrypts the transferred key encryption key to produce the user encryption key to use to decrypt the plain-text data transferred from the source tape drive to produce the plain-text data to write to the destination tape medium.

9. A computer program product implemented in a tape drive in which a tape cartridge is coupled including a tape medium, the computer program product comprising a computer readable storage medium having computer readable program code embodied therein that is executable to perform operations, the operations comprising:
receiving, from a user computer associated with a user, plain-text data to write to the tape medium;
sending, to the user computer, a product specific public key associated with the tape drive;
receiving, from the user computer, a key encryption key comprising a user encryption key, associated with the user, encrypted with the product specific public key, wherein the product specific public key and a product specific private key, maintained in the tape drive, are a pair of keys in a cryptographic system;
decrypting the key encryption key with the product specific private key to produce the user encryption key; and
using the user encryption key to encrypt the plain-text data read from the tape medium to return to a read request.

10. The computer program product of claim 9, wherein the operations further comprise:

storing the key encryption key in a non-volatile memory of the tape cartridge;
detecting the tape cartridge being re-inserted into the tape drive after being ejected from the tape drive;
accessing the key encryption key from the non-volatile memory of the re-inserted tape cartridge; and
decrypting the accessed key encryption key with the product specific private key to produce the user encryption key to use to encrypt plain-text data read from the tape medium.

11. The computer program product of claim 9, wherein the received key encryption key comprises a first key encryption key, and wherein the user encryption key comprises a first user encryption key, wherein the operations further comprise:
determining whether the decrypting succeeded in producing the first user encryption key; and
storing the first key encryption key in a non-volatile memory of the tape cartridge in response to the determining the decrypting succeeded in producing the user encryption key, wherein the storing the first key encryption key overwrites a second key encryption key stored in the non-volatile memory of the tape cartridge, comprising a second user encryption key associated with the user and encrypted with the product specific public key, wherein the second key encryption key was stored in the non-volatile memory of the tape cartridge before the first key encryption key was received from the user.

12. The computer program product of claim 11, wherein the operations further comprise:
in response to the determining the decrypting did not succeed in producing the first user encryption key, deleting the second key encryption key stored in the non-volatile memory of the tape cartridge.

13. The computer program product of claim 9, wherein the operations further comprise:
receiving a product specific key from the user as part of receiving the key encryption key from the user; and
determining whether the product specific public key received from the user matches the product specific key stored in a non-volatile memory of the tape cartridge, wherein the decrypting the key encryption key and using the user encryption key decrypted from the key encryption key are performed in response to determining that the product specific public key received from the user matches the product specific key stored in the non-volatile memory of the tape cartridge.

14. A system comprising a tape drive in which a tape cartridge is coupled, comprising:
a non-volatile memory;
a tape medium;
a computer readable storage medium having computer readable program code embodied therein that is executed to perform operations, the operations comprising:
determining whether the non-volatile memory of the tape cartridge stores a key encryption key comprising an user encryption key associated with a user that is encrypted with a public key of a private key and public key pair; and
in response to determining that the non-volatile memory of the tape cartridge stores the key encryption key, performing:
decrypting the key encryption key with the private key to produce the user encryption key; and
providing the user encryption key, resulting from the decrypting, to an encryption engine of the tape drive to encrypt plain-text data read from the tape medium in the tape cartridge with the user encryption key to return to a read request.

15. The system of claim 14, wherein the key encryption key in the non-volatile memory of the tape cartridge is signed with a user private key associated with the user, wherein the non-volatile memory of the tape cartridge includes a user public key, wherein the operations in response to the non-volatile memory of the tape cartridge storing the key encryption key and the user public key comprise:
using the user public key to authenticate the signed key encryption key to produce the key encryption key, wherein the decrypting the key encryption key is performed in response to authenticating the signed key encryption key.

16. The system of claim 14, wherein the operations further comprise:
receiving a read request for the plain-text data in the tape medium; and
in response to the read request, using, by the encryption engine, the user encryption key to encrypt the requested plain-text data from the tape medium to return the encrypted requested plain-text data to the read request.

17. The system of claim 14, wherein the tape drive comprises a source tape drive, the tape cartridge comprises a source tape cartridge, and the tape medium comprises a source tape medium, and wherein the read request comprises an operation to transfer encrypted plain-text data from the source tape medium to a destination tape medium in a destination tape cartridge coupled to a destination tape drive, wherein the operations further comprise:
transferring the key encryption key from the source tape drive to the destination tape drive to store in the destination tape drive, wherein the destination tape drive decrypts the transferred key encryption key to produce the user encryption key to use to decrypt the plain-text data transferred from the source tape drive to produce the plain-text data to write to the destination tape medium.

18. A system comprising a tape drive in which a tape cartridge is coupled, comprising:
a tape medium;
receiving, from a user computer associated with a user, plain-text data to write to the tape medium; and
a computer readable storage medium having computer readable program code embodied therein that is executed to perform operations, the operations comprising:
sending, to the user computer, a product specific public key associated with the tape drive;
receiving, from the user computer, a key encryption key comprising a user encryption key, associated with the user, encrypted with the product specific public key, wherein the product specific public key and a product specific private key, maintained in the tape drive, are a pair of keys in a cryptographic system;
decrypting the key encryption key with the product specific private key to produce the user encryption key; and
using the user encryption key to encrypt the plain-text data read from the tape medium to return to a read request.

19. The system of claim 18, wherein the operations further comprise:
storing the key encryption key in a non-volatile memory of the tape cartridge;
detecting the tape cartridge being re-inserted into the tape drive after being ejected from the tape drive;
accessing the key encryption key from the non-volatile memory of the re-inserted tape cartridge; and
decrypting the accessed key encryption key with the product specific private key to produce the user encryption key to use to encrypt plain-text data read from the tape medium.

20. The system of claim 18, wherein the received key encryption key comprises a first key encryption key, and wherein the user encryption key comprises a first user encryption key, wherein the operations further comprise:
determining whether the decrypting succeeded in producing the first user encryption key; and
storing the first key encryption key in a non-volatile memory of the tape cartridge in response to the determining the decrypting succeeded in producing the user encryption key, wherein the storing the first key encryption key overwrites a second key encryption key stored in the non-volatile memory of the tape cartridge, comprising a second user encryption key associated with the user and encrypted with the product specific public key, wherein the second key encryption key was stored in the non-volatile memory of the tape cartridge before the first key encryption key was received from the user.

21. The system of claim 20, wherein the operations further comprise:
in response to the determining the decrypting did not succeed in producing the first user encryption key, deleting the second key encryption key stored in a non-volatile memory of the tape cartridge.

22. A method implemented in a tape drive in which a tape cartridge is coupled, comprising:
determining whether a non-volatile memory of the tape cartridge stores a key encryption key comprising an user encryption key associated with a user that is encrypted with a public key of a private key and public key pair; and
in response to determining that the non-volatile memory of the tape cartridge stores the key encryption key, performing:
decrypting the key encryption key with the private key to produce the user encryption key; and
providing the user encryption key, resulting from the decrypting, to an encryption engine of the tape drive to encrypt plain-text data read from a tape medium in the tape cartridge with the user encryption key to return to a read request.

23. The method of claim 22, wherein the key encryption key in the non-volatile memory of the tape cartridge is signed with a user private key associated with the user, wherein the non-volatile memory of the tape cartridge includes a user public key, comprising:
in response to the non-volatile memory of the tape cartridge storing the key encryption key and the user public key, using the user public key to authenticate the signed key encryption key to produce the key encryption key, wherein the decrypting the key encryption key is performed in response to authenticating the signed key encryption key.

24. The method of claim 22, further comprising:
receiving a read request for the plain-text data in the tape medium; and
in response to the read request, using, by the encryption engine, the user encryption key to encrypt the requested plain-text data from the tape medium to return the encrypted requested plain-text data to the read request.

25. The method of claim 22, wherein the tape drive comprises a source tape drive, the tape cartridge comprises a source tape cartridge, the tape medium comprises a source tape medium, and wherein the read request comprises an operation to transfer encrypted plain-text data from the source tape medium to a destination tape medium in a destination tape cartridge coupled to a destination tape drive, further comprising:

transferring the key encryption key from the source tape drive to the destination tape drive to store in the destination tape drive, wherein the destination tape drive decrypts the transferred key encryption key to produce the user encryption key to use to decrypt the plain-text data transferred from the source tape drive to produce the plain-text data to write to the destination tape medium.

\* \* \* \* \*